(12) United States Patent
Takagi et al.

(10) Patent No.: US 8,215,939 B2
(45) Date of Patent: Jul. 10, 2012

(54) TIRE VULCANIZATION FORMING MOLD

(75) Inventors: Chikara Takagi, Hashima (JP); Tatsumi Tanaka, Hashimi (JP)

(73) Assignees: Fuji Seiko Co., Ltd., Hashima-shi (JP); Fuji Shoji Co., Ltd., Hashima-shi (JP)

( * ) Notice: Subject to any disclaimer, the term of this patent is extended or adjusted under 35 U.S.C. 154(b) by 0 days.

(21) Appl. No.: 13/122,516

(22) PCT Filed: Jul. 16, 2009

(86) PCT No.: PCT/JP2009/062864
§ 371 (c)(1),
(2), (4) Date: Apr. 4, 2011

(87) PCT Pub. No.: WO2010/047162
PCT Pub. Date: Apr. 29, 2010

(65) Prior Publication Data
US 2011/0183022 A1   Jul. 28, 2011

(30) Foreign Application Priority Data
Oct. 23, 2008   (JP) ................................ 2008-273104

(51) Int. Cl.
*B29C 35/02* (2006.01)
(52) U.S. Cl. .......................... 425/46; 425/28.1; 425/195
(58) Field of Classification Search .................. 425/28.1, 425/46, 47, 195
See application file for complete search history.

(56) References Cited

U.S. PATENT DOCUMENTS

| 2,297,017 | A | * | 9/1942 | Overman | 425/46 |
| 4,553,918 | A | * | 11/1985 | Yoda et al. | 425/46 |
| 5,234,326 | A | * | 8/1993 | Galli et al. | 425/46 |
| 5,340,294 | A | * | 8/1994 | Kata | 425/46 |
| 6,196,818 | B1 | * | 3/2001 | Coleman et al. | 425/46 |
| 2007/0187117 | A1 | | 8/2007 | Tanaka et al. | |

FOREIGN PATENT DOCUMENTS

| JP | 62 054050 | 3/1987 |
| JP | 3102991 | 10/2000 |
| JP | 2005 238744 | 9/2005 |
| JP | 2006 305765 | 11/2006 |
| JP | 2007 190803 | 8/2007 |

OTHER PUBLICATIONS

International Search Report issued Aug. 25, 2009 in PCT/JP09/62864 filed Jul. 16, 2009.

* cited by examiner

*Primary Examiner* — James Mackey
(74) *Attorney, Agent, or Firm* — Oblon, Spivak, McClelland, Maier & Neustadt, L.L.P.

(57) ABSTRACT

In a tire vulcanization forming mold which is circumferentially divided into a plurality of segment molds, a plurality of circumferential grooves are formed on each segment mold with spaces in a tire width direction; arc-shape mold blocks are detachably fitted respectively in the plurality of circumferential grooves; a plurality of slit grooves are formed on each mold block to open on side surfaces of the mold block; tread pattern forming blades are detachably inserted into these slit grooves in the tire width direction; and coming-off prevention engaging portions are provided on the slit grooves and the blades. Thus, the tire vulcanization forming mold is capable of enabling the blades to be replaced easily with respect to the segment molds.

10 Claims, 8 Drawing Sheets

TIRE VULCANIZATION FORMING MOLD

TECHNICAL FIELD

The present invention relates to a tire vulcanization forming mold comprising segment molds which are divided in the circumferential direction for forming a tread pattern on a tire, and particularly, it relates to a tire vulcanization forming mold in which blades for forming a tread pattern are enabled to be attached or detached with respect to segment molds.

BACKGROUND ART

In forming a tire, there is used a mold which applies a pressure to the inside of a formed green tire and brings the outer surface of the green tire into pressure contact with the inner wall of the heated mold to vulcanize the green tire with heat and under pressure. On the internal surface side (on a tread side of the tire) of such a mold, a plurality of blades are provided for forming a tread pattern on the tire. The blades comprises circumferential groove forming blades (protruding streaks) for forming grooves being continuous in the circumferential direction of the tire, tread forming blades for forming tread grooves of predetermined shapes on the tread surface of the tire and sipe forming blades for forming sipes of a thin groove shape. Usually, a mold with a tread pattern formed thereon is divided into a plural number (for example, eight segments) in the circumferential direction.

Heretofore, electric discharge machines or the like have been used to form tread patterns by extra material cutoff machining. However, particularly, sipe forming blades for forming sipes take the form of a thin plate, and thus, difficulties arise in cutting them out. Thus, it has been conceived to form on a mold thin grooves for planting sipe forming blades and to secure the sipe forming blades to the mold after inserting the sipe forming blades into the thin grooves. As a mold of this kind, there has been known one which is described in, for example, Patent Document 1.

In the mold described in Patent Document 1, in order that the blades inserted into the thin grooves do not come off, each blade planting groove is formed at its bottom portion with a step portion having a greater thickness than the groove thickness of the groove, a U-shape notch is formed on each blade, and the portion surrounded by the notch is plastically deformed to form a bent portion, so that once the blade is inserted into the blade planting groove, the blade does not come off as a result of being engaged at the bent portion thereof with the step portion of the blade planting groove.

PRIOR ART DOCUMENT

Patent Document

Patent Document 1: JP 2005-238744 A

SUMMARY OF THE INVENTION

Problem to be Solved by the Invention

In one described in the aforementioned Patent Document 1, in order to form the bottom portion of the blade planting groove with the step portion having the greater thickness than the groove thickness of the groove, it is required to manufacture respective pieces of the tire vulcanization mold in a particular method such as powder sintering method or the like of depositing sinterable powder through heating and sintering, and this gives rise to a problem that the manufacturing of the mold needs a plenty of time and results in an increase in manufacturing cost.

In addition, in the molds of this kind, a large stress acts on the tread pattern forming blades at the time of releasing the tire from the mold following the vulcanization forming, and therefore, the repetition of the vulcanization forming of tires would bring about the situation that deformation or damage takes place particularly in the thin sipe forming blades. However, in the mold described in Patent Document 1, although it is easy to attach the sipe forming blades to the mold, it is unable to draw out the sipe forming blades once the same are inserted. Therefore, when the sipe forming blades are deformed or damaged, the repair works are difficult to do, so that it is required to make an exchange on the mold basis.

The present invention has been made taking the foregoing problems in the prior art into consideration, and an object thereof is to provide a tire vulcanization forming mold which is designed to be able to easily exchange tread pattern forming blades with respect to segment molds.

Solution to the Problem

In order to solve the foregoing problems, the feature of the invention in a first aspect resides in that in a tire vulcanization forming mold which is circumferentially divided into a plurality of segment molds, a plurality of circumferential grooves are formed on each segment mold with spaces in a tire width direction, that arc-shape mold blocks are respectively detachably fitted and secured in the plurality of circumferential grooves, that a plurality of slit grooves are formed on each mold block to open on a side surface of the mold block, that tread pattern forming blades are detachably inserted into these slit grooves in the tire width direction, and that coming-off prevention engaging portions are provided on the slit grooves and the blades.

The feature of the invention in a second aspect resides in that in a tire vulcanization forming mold which is circumferentially divided into a plurality of segment molds, each segment mold is divided into a plurality of mold pieces in a tire width direction, that a plurality of mold blocks are arranged in respective spaces between the plurality of these mold pieces, that the plurality of these mold pieces and the plurality of mold blocks are bodily secured by a bolt, that a plurality of slit grooves are formed on each mold block to open on a side surface of the mold block, that tread pattern forming blades are detachably inserted into these slit grooves in the tire width direction, and that coming-off prevention engaging portions are provided on the slit grooves and the blades.

The feature of the invention in a third aspect resides in that in the first or second aspect, the blades comprise sipe forming blades.

The feature of the invention in a fourth aspect resides in that in the first or second aspect, the blades comprise tread groove forming blades and sipe forming blades.

The feature of the invention in a fifth aspect resides in that in any one of the first to fourth aspects, each segment mold has a protruding streak which is for forming a groove being continuous in a tire circumferential direction, at each place between the plurality of mold blocks.

The feature of the invention in a sixth aspect resides in that in any one of the first to fifth aspects, the slit grooves take an L-shape as viewed from side parts of the mold blocks, that the blades are made of L-shape metal plates which are engaged with the L-shape slit grooves, and that these L-shapes constitute the coming-off prevention engaging portions.

Advantageous Effects of the Invention

In the invention in the first aspect, the arc-shape mold blocks are detachably fitted and secured in the plurality of circumferential grooves which are formed on each segment mold with spaces in the tire width direction, the plurality of slit grooves are formed on each mold block to open on the side surface of the mold block, the tread pattern forming blades are detachably inserted into these slit grooves in the tire width direction, and the coming-off prevention engaging portions are provided on the slit grooves and the blades. Thus, it is possible to manufacture the segment molds easier than those in which blades are formed by being cut out as practiced in the prior art. In addition, where the blades are damaged, it is possible to change the blades only by detaching the same from the slit grooves of the mold blocks, and hence, the replacement is economical.

In the invention in the second aspect, each segment mold is divided into the plurality of mold pieces in the tire width direction, the plurality of arc-shape mold blocks are arranged in respective spaces between the plurality of these mold pieces, the plurality of these mold pieces and the plurality of mold blocks are bodily secured by the bolt, the plurality of slit grooves are formed on each mold block to open on the side surface of the mold block, the tread pattern forming blades are detachably inserted into these slit grooves in the tire width direction, and the coming-off prevention engaging portions are provided on the slit grooves and the blades. Thus, as is the same as described in claim 1, it is possible to manufacture the segment molds easily. Where the blades are damaged, it is possible to change the blades only, and thus, the replacement is economical. In addition, since the connections are made not to provide clearances between the side surfaces of the mold blocks and the mold pieces, passages which are for discharging gas during the vulcanization forming of a tire can be formed at equal accuracies.

In the invention in the third aspect, the blades comprise sipe forming blades. Thus, particularly, where the sipe forming blades being a thin shape are deformed or damaged, it is possible to easily change the sipe forming blades following the separation of the mold blocks.

In the invention in the fourth aspect, since the blades comprise the tread groove forming blades and the sipe forming blades, nothing is required to do but to simply machine the inner circumferential surfaces on the internal surfaces of the mold blocks, so that it is possible to manufacture the segment molds easily.

In the invention in the fifth aspect, each segment mold has the protruding streaks which define grooves being continuous in the tire circumferential direction at the respective places between the plurality of mold blocks. Thus, by utilizing partition walls for the mold blocks, it is possible to form the grooves being continuous in the tire circumferential direction.

In the invention in the sixth aspect, the slit grooves take the L-shape as viewed from the sides of the mold blocks, the blades comprise the L-shape metal plates which are respectively fitted in the L-shape slit grooves, and these L-shapes constitute the coming-off prevention engaging portions. Thus, it is possible to easily form the L-shape slit grooves on the mold blocks by wire cut electric discharge machining or the like, while it is possible to easily form the blades by press forming.

EMBODIMENTS FOR PRACTICING THE INVENTION

Figure 1:
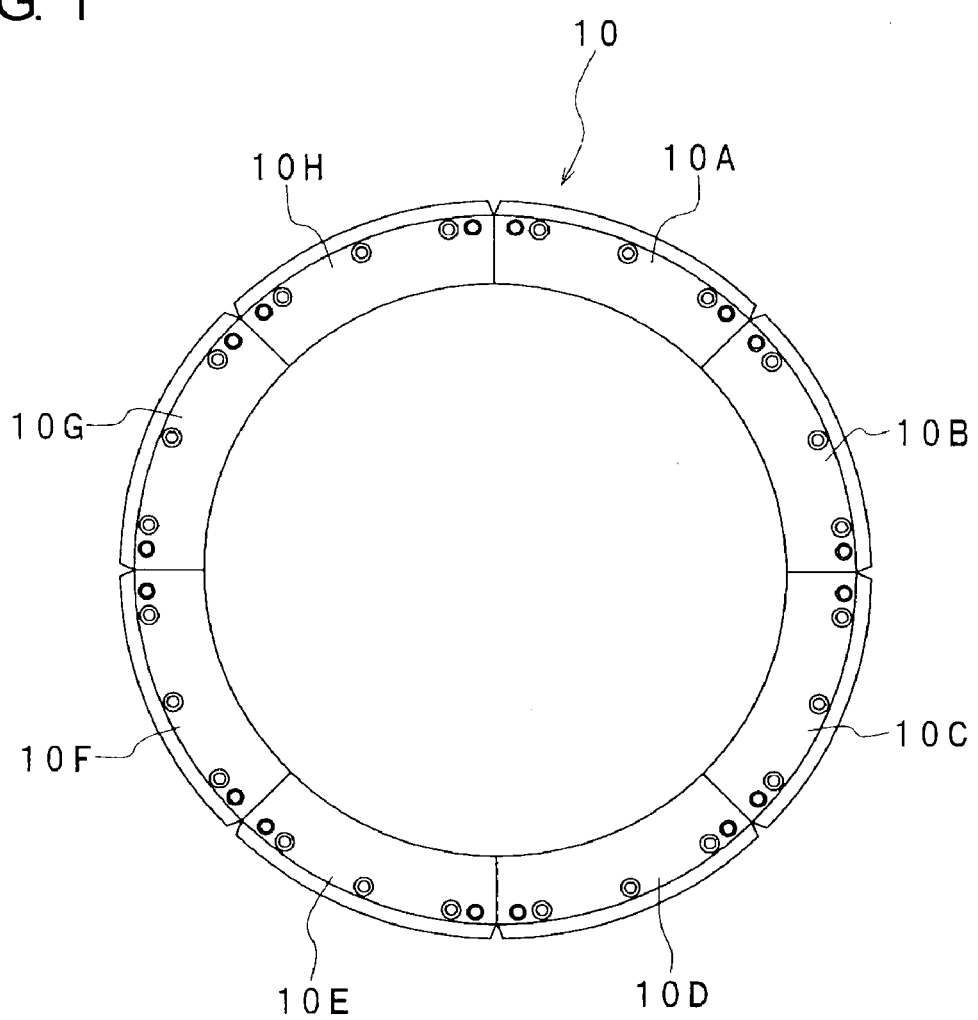
FIG. 1 is a view showing a tire vulcanization forming mold according embodiments of the present invention.

Hereafter, a first embodiment of the present invention will be described with reference to the drawings. FIG. 1 shows a mold 10 for vulcanizing and forming a tire, and the mold 10 is composed of segment molds 10A-10H which are divided into, for example, eight segments in the circumferential direction for forming a tread surface of the tire (not shown). The respective segment molds 10A-10H are the same in construction, and therefore, the construction of the segment mold 10A will hereafter be described in detail.

Figure 2:
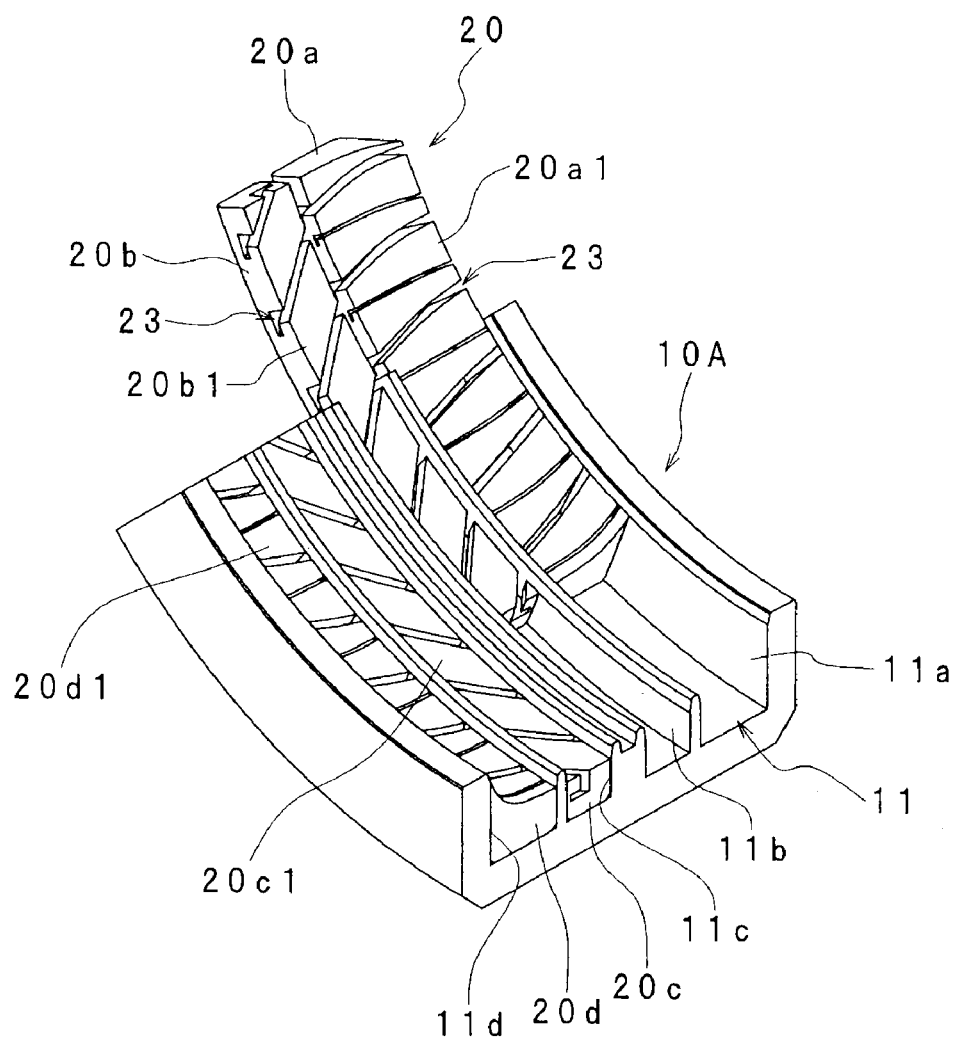
FIG. 2 is a perspective view of a circumferentially divided segment mold shown as a first embodiment of the present invention.
Figure 3:
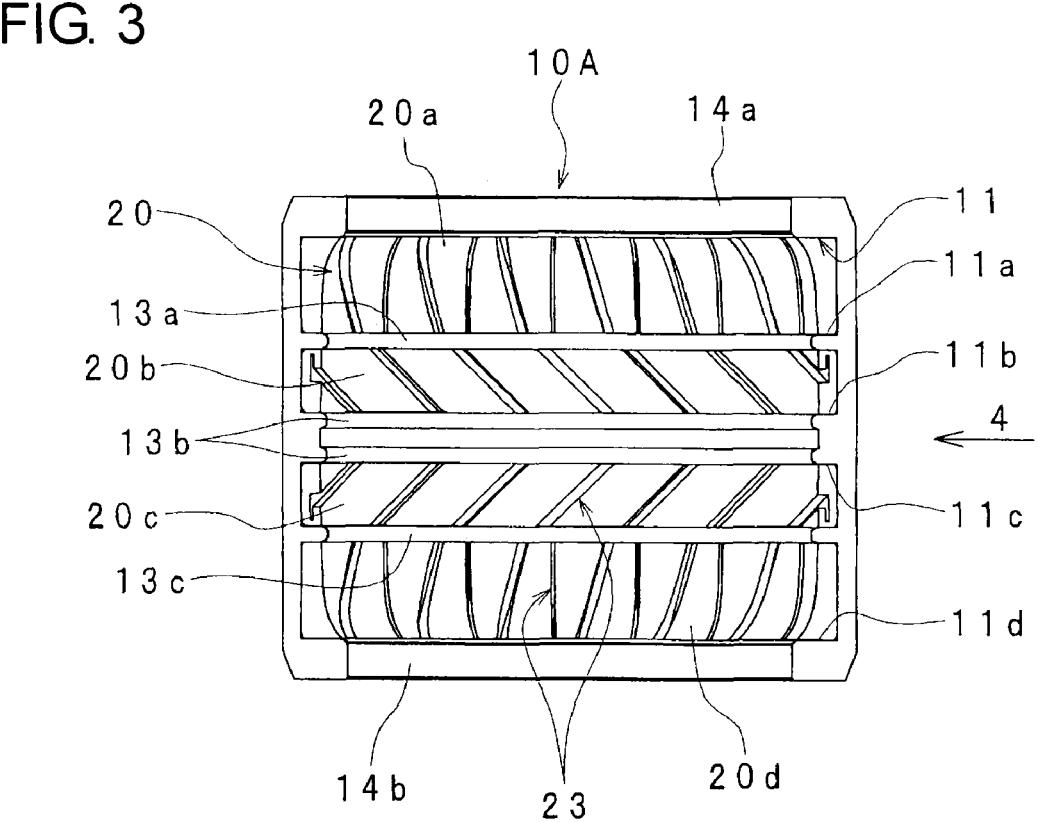
FIG. 3 is an interior view of the segment mold showing one example of a tread pattern.
Figure 4:
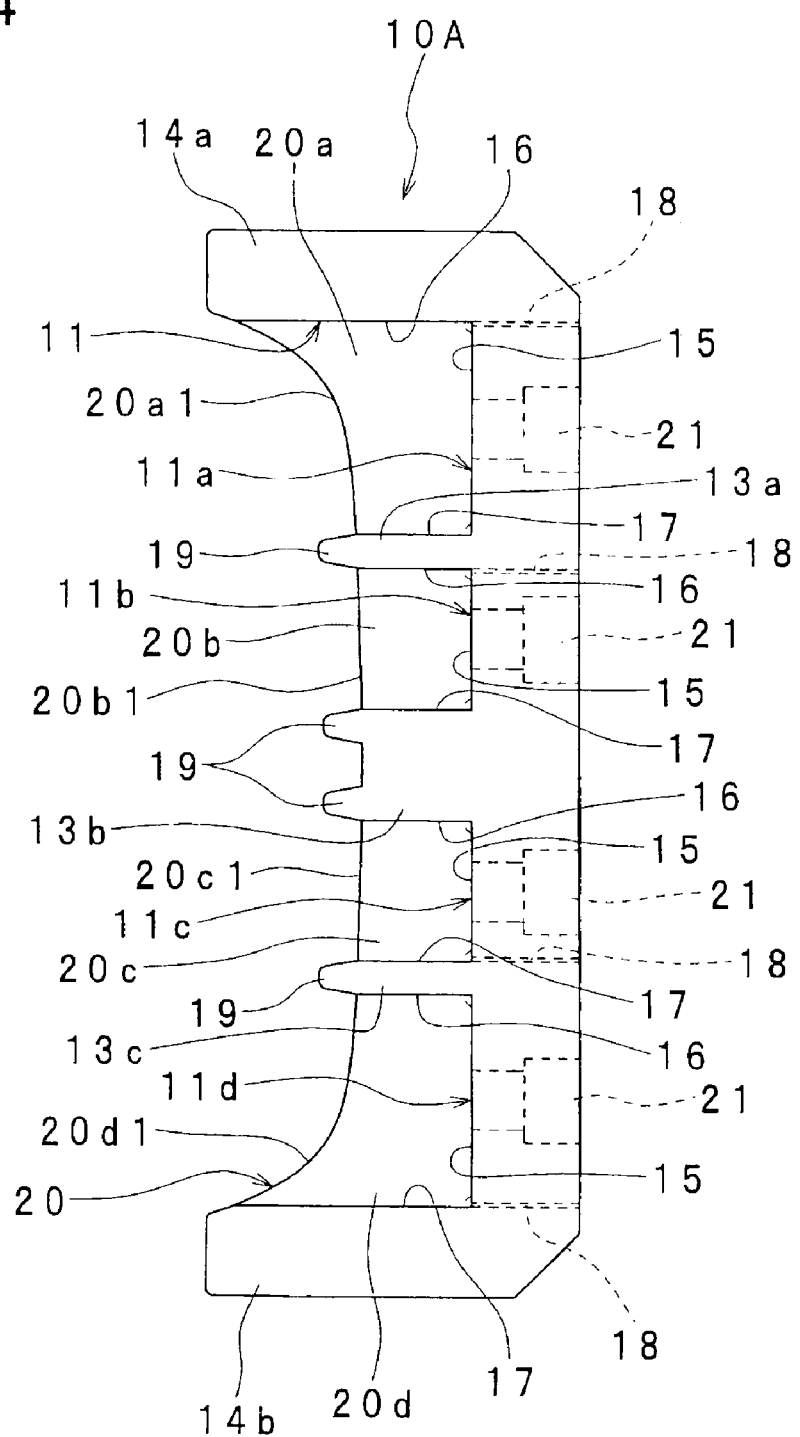
FIG. 4 is a view showing a partition surface of the segment mold as viewed in the direction indicated by the arrow 4 in FIG. 3.

As shown in FIGS. 2, 3 and 4, on an internal surface of the segment mold 10A, a plurality of circumferential grooves 11 are formed with spaces in the width direction (tire width direction). In the embodiment, one example is illustrated as a case that four circumferential grooves 11a, 11b, 11c, 11d are formed with spaces therebetween in the width direction. The segment mold 10A has partition walls 13a, 13b, 13c formed at respective places between the circumferential grooves 11a-11d. Further, end walls 14a, 14b are formed at both end portions of the segment mold 10A in the width direction. As shown in FIG. 4, the circumferential grooves 11a-11d which are arranged at respective places between the end wall 14a, the partition walls 13a, 13b, 13c and the end wall 14b each take a U-shape which has an arc-shape bottom surface 15 extending in the circumferential direction and side walls 16, 17 perpendicularly extending at both ends of the bottom surface 15.

Arc-shape mold blocks 20 (20a, 20b, 20c, 20d) having cross-sections which are complementary to the circumferential grooves 11a-11d are respectively fitted in the respective circumferential grooves 11a-11d and are detachably secured by bolts 21 to the segment mold 10A. Discharge holes 18 for discharging outside the gas which is generated during a vulcanization forming respectively open on the bottom surfaces 15 of the circumferential grooves 11a-11d, and these discharge holes 18 are able to communicate with the interior of the mold 10 through clearances between the respective side walls 16, 17 of the circumferential grooves 11a-11d and both side surfaces of the mold blocks 20a-20d.

At the tops of the respective partition walls 13a, 13b, 13c, protruding streaks 19 for forming circumferential groove portions of plural lines on an outer circumferential surface of the tire are formed to protrude predetermined amounts beyond the inner circumferential surfaces 20a1-20d1 of the mold blocks 20a-20d secured to the segment mold 10A and to extend in the circumferential direction. The outer surface of the tire to be vulcanized and formed is defined by the segment mold 10A and the inner circumferential surfaces 20a1-20d1 of the plurality of mold blocks 20a-20d secured to the segment mold 10A.

A plurality of slit grooves 23 are formed on the mold blocks 20a-20d with spaces in the circumferential direction of the block bodies 20a-20d. Blades 25 for forming a tread pattern on the tire are detachably inserted into the respective slit grooves 23. FIGS. 2 to 5 show the state before the blades 25 are inserted into the slit grooves 23, while FIG. 6 and those subsequent thereto show the state that the blades 25 are attached to the slit grooves 23.

The blades 25 comprise sipe forming blades 25A (refer to FIG. 7) for forming sipes each taking the form of a thin groove and tread groove forming blades 25B (refer to FIG. 8) for forming tread grooves which are thicker than the sipes. On the other hand, the slit grooves 23 comprise slit grooves 23A for attaching the sipe forming blades 25A and slit grooves 23B for attaching the tread groove forming blades 25B.

Figure 5:
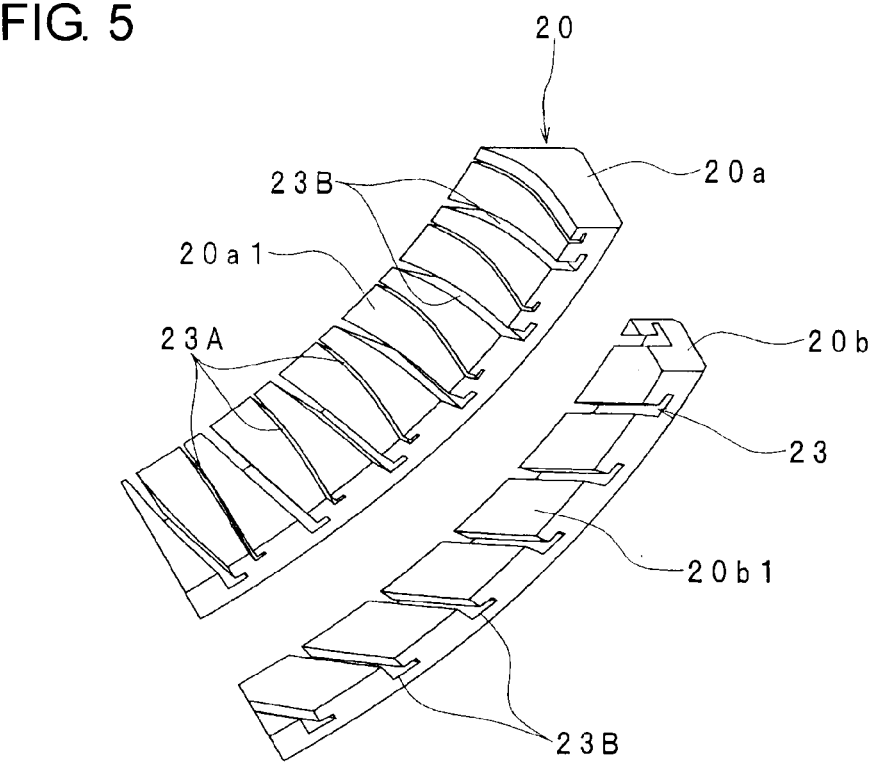
FIG. 5 is a perspective view of mold blocks each with slit grooves formed thereon.

As shown in FIG. 3, these slit grooves 23A, 23B are formed as straight lines being parallel in the with direction of the mold blocks 20a-20d or as straight lines inclined at predetermined angles relative thereto. Further, as shown in FIG. 5, the slit grooves 23A, 23B are formed over the whole length in the width direction of the mold blocks 20a-20d, and both end portions of the slit grooves 23A, 23B open on side surfaces of the mold blocks 20a-20d.

Figure 7:
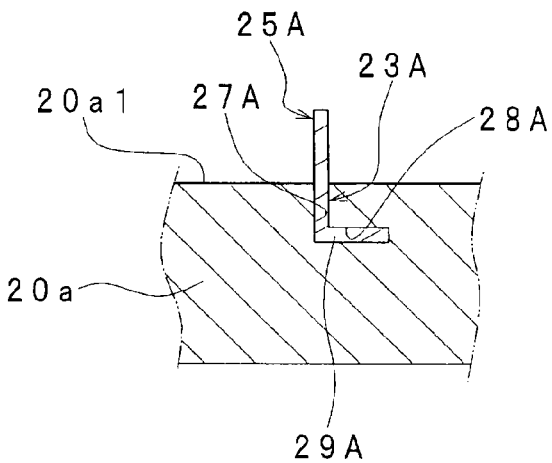
FIG. 7 is a sectional view taken along the line 7-7 in FIG. 6, showing the engaging state between a slit groove and a sipe forming blade.

Regarding the slit grooves 23A for attaching the sipe forming blades 25A, as shown in FIG. 7, radial groove portions 27A of a constant thickness are formed from the respective inner circumferential surfaces 20a1, 20d1 of the mold block 20a, 20d to a predetermined depth in the radial direction, and orthogonal groove portions 28A which are continuous with the radial groove portions 27A in a direction orthogonal to the same are formed at bottom portions of the radial groove portions 27A. That is, the slit grooves 23A take an L-shape in cross-section and are machined by, for example, wire cut discharge machining. The sipe forming blades 25A which are detachably inserted into the slit grooves 23A are constituted by metal plates which are complementary to the slit grooves 23A in thickness and which have at inner end portions thereof bent portions 29A bent in an L-shape, and have width dimensions covering the whole lengths in the width direction of the mold blocks 20a, 20d.

Figure 8:
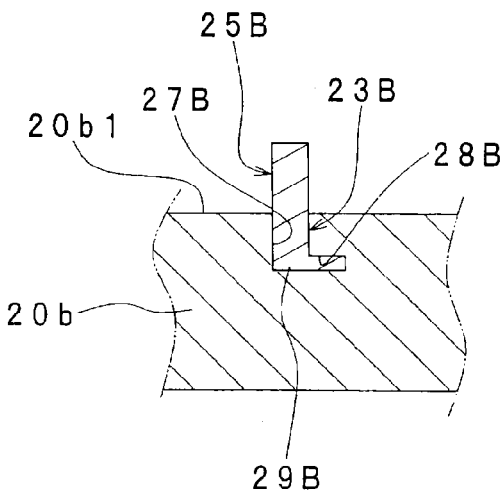
FIG. 8 is a sectional view taken along the line 8-8 in FIG. 6, showing the engaging state between a slit groove and a tread groove forming blade.

On the other hand, regarding the slit grooves 23B for attaching the tread groove forming blades 25B, as shown in FIG. 8, radial groove portions 27B which are larger in groove thickness than the slit grooves 23A are formed from the respective inner circumferential surfaces 20a1-20d1 of the mold blocks 20a-20d to a predetermined depth in the radial direction, and orthogonal groove portions 28B which are continuous with the radial groove portions 27B in a direction orthogonal to the same are formed at bottom portions of the radial groove portions 27B. Like the slit grooves 23A, the slit grooves 23B take an L-shape in cross-section and are machined by, for example, wire cut electric discharge machining. The tread forming blades 25B which are detachably inserted into the slit grooves 23B are complementary to the slit grooves 23B in thickness, have at inner ends thereof orthogonal potions 29B extending orthogonally in an L-shape and have width dimensions covering the whole lengths in the width direction of the mold blocks 20a-20d.

In advance of fitting the mold blocks 20a-20d in the circumferential grooves 11a-11d of the segment mold 10A, the respective blades 25A, 25b are inserted into the respective slit grooves 23A, 23B from the end surfaces of the mold blocks 20a-20d. The inserted blades 25A, 25B are prevented by the bent portions 29A and the orthogonal portions 29B, which take the L-shape, from coming off. The bent portions 29A and the orthogonal portions 29B which are fitted in the orthogonal groove portions 28A, 28B of the slit grooves 23A, 23B constitute coming-off prevention engaging portions in the claims.

Figure 6:
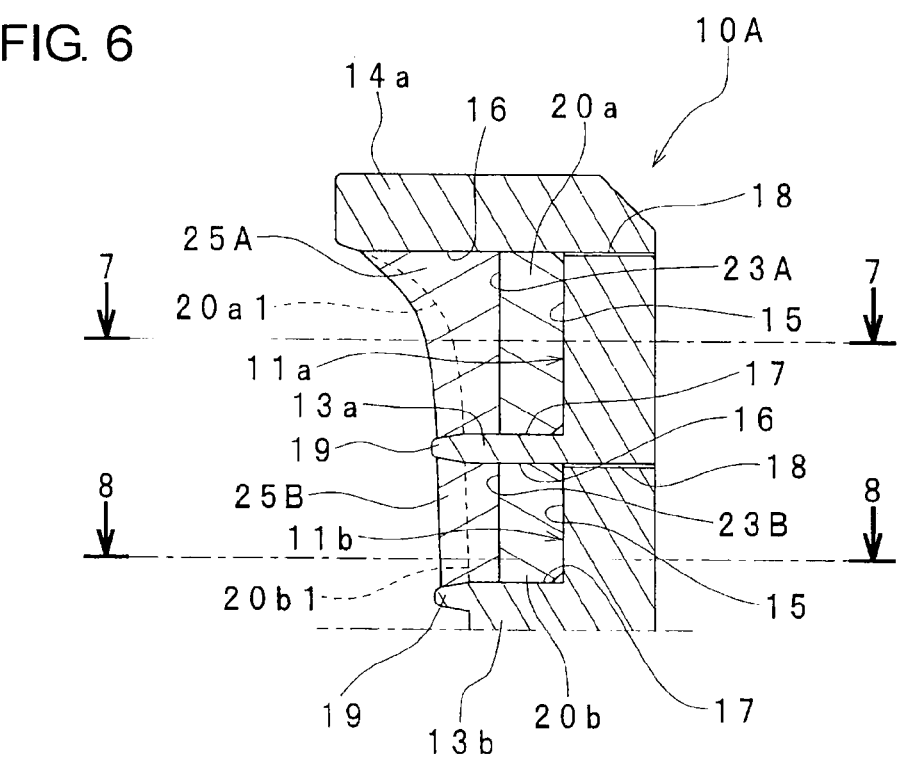
FIG. 6 is a sectional view of the segment mold which is shown with blades attached to the mold blocks.

After the blades 25A, 25B are inserted into the slit grooves 23A, 23B, the mold blocks 20a-20d are fitted in the circumferential grooves 11a-11d of the segment mold 10A and are secured thereto by the bolts 21. In this state, as shown in FIG. 6, the both side surfaces of the blades 25A, 25B are held in contact with the side walls 16, 17 of the circumferential grooves 11a-11d to restrict the blades 25A, 25B from moving in the width direction. In addition, a unique point of this construction resides in that the removals of the mold blocks 20a-20d from the segment mold 10A make it possible for the blades 25A, 25B to be freely detachable relative to the slit grooves 23A, 23B from the side portions (in the tire width direction) of the mold blocks 20a-20d. With this, the exchanges of the blades 25A, 25B can be done easily where the blades 25A, 25B are damaged or the like.

The sipe forming blades 25A and the tread groove forming blades 25B which are held inserted into the slit grooves 23A, 23B are dimensioned to protrude by predetermined amounts from the inner circumferential surfaces 20a1-20d1 of the mold blocks 20a-20d, and the protruding amounts of these blades 25A, 25B become the groove depths of the tread grooves and the sipe grooves which are to be formed on a tire.

Since the mold 10 according to the foregoing first embodiment is constructed as described above, in dependence on a tread pattern to be formed on a tire, the plurality of U-shape circumferential grooves 11a-11d arranged in the width direction are formed on the inner circumferential surfaces of the segment mold 10A (10B-10H) which is divided in the circumferential direction, and the mold blocks 20a-20d having attached thereto the sipe forming blades 25A and the tread groove forming blades 25B are fitted in these circumferential grooves 11a-11d and are secured thereto by the bolts 21. In this way, the sipe forming blades 25A and the tread groove forming blades 25B are detachably inserted into the slit grooves 23A, 23B formed on the mold blocks 20a-20d from the side surfaces of the mold blocks 20a-20d.

Where a tire is to be vulcanized and formed, the plurality of segment molds 10A-10H described above are attached to a tire vulcanization forming apparatus. In this state, an unvulcanized tire (green tire) to be vulcanized and formed is loaded into the mold 10. Following the loading of the unvulcanized tire, a bladder is expanded, and then, the segment molds 10A-10H are advanced inward in the radial directions to a mold close position to keep a vulcanization space airtight. As the segment molds 10A-10H are advanced to the mold close position, steam is supplied into the bladder, and the outer circumferential surface of the unvulcanized tire is pressed on the inner circumferential surfaces of the segment molds 10A-10H, whereby a vulcanization processing is carried out to transfer the tread pattern formed on the inner circumferential surfaces of the segment molds 10A-10H. During this vulcanization processing, the gas which is generated between the outer circumferential surface of the tire and the inner circumferential surfaces of the segment molds 10A-10H is discharged outside of the mold 10 through the clearances between the respective side walls 16, 17 of the circumferential grooves 11a-11d and the both side surfaces of the mold blocks 20a-20d and through the discharge holes 18. Upon lapse of a predetermined vulcanization time, the segment molds 10A-10H are retracted outward in the radial directions, and then, the bladder is reduced in the pressure therein to be contracted. In this state, the tire having been vulcanized is unloaded from the mold 10.

On this occasion, at the time of mold separation following the vulcanization forming of the tire, a large stress acts on the sipe forming blades 25A and the tread groove forming blades 25B. However, because the slit grooves 23A, 23B and the blades 25A, 25B are formed to the L-shape, it is possible to reliably prevent the blades 25 from coming off the slit grooves 23 even when a large stress acts on the sipe forming blades 25A and the tread groove forming blades 25B. Furthermore, since the mold blocks 20a-20d are fitted in the circumferential grooves 11 of the segment molds 10A-10H to be secured thereto after insertions of the sipe forming blades 25A and the tread groove forming blades 25B into the slit grooves 23A, 23B, the side walls 16, 17 of the circumferential grooves 11a-11d can prevent the movements of the sipe forming blades 25A and the tread groove forming blades 25B which have been inserted into the slit grooves 23A, 23B. Accordingly, it is also not required to secure the blades 25A, 25B which have been inserted into the slit grooves 23A, 23B.

Further, where the repetition of the vulcanization forming of tires causes the sipe forming blades 25A being particularly thin in thickness to be deformed or damaged, the mold blocks 20a-20d are disassembled from the segment molds 10A-10H, in which state the damaged sipe forming blades 25A are removed from the side surfaces of the mold blocks 20a-20d, so that it is possible to easily replace them by fresh sipe forming blades.

Figure 9:
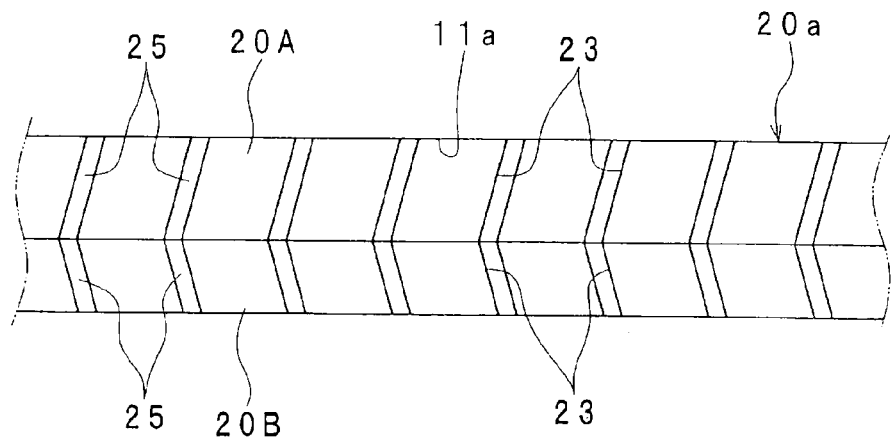
FIG. 9 is a view showing a modified form of FIG. 3.

In this way, according to the present embodiment, since the blades 25A, 25B are arranged by being inserted into the slit grooves 23A, 23B formed on the mold blocks 20a-20d, the manufacturing of the segment molds 10A-10H can be carried out easily in comparison with the prior art manufacturing in which blades are formed by being cut out. In addition, when the blades 25A (25B) are damaged, it is only required to replace the blades 25A (25B), and the segment molds 10A-10H and the mold blocks 20a-20d can be used continuously, so that such replacement is economical. Since the replacements of the blades 25A (25B) can be done only by drawing them out from the side parts after the disassembling of the mold blocks 20a-20d, the replacement work can be done easily.

Where the sipes or the tread grooves to be formed on the tire are each constituted by two continuous straight lines which are bent relative to each other, for example, the mold block 20a fitted in the circumferential groove 11a is divided by two blocks (20A, 20B) which as shown in FIG. 9, take a boundary at the bent portion, and slit grooves 23 are formed on these divided mold blocks 20A, 20B at respectively predetermined angles. Then, by securing the two divided mold blocks 20A, 20B, which have the blades 25 respectively inserted into these slit grooves 23, in one circumferential groove 11a in a juxtaposed relation, it becomes possible for the juxtaposed blades 25 to form the shape which is in agreement with the shape of the sipes or the tread grooves to be formed.

Figure 10A:
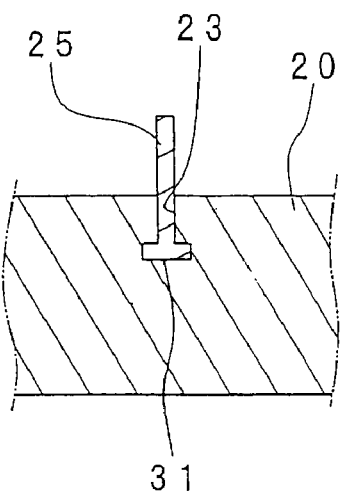
FIGS. 10(A)-10(C) are sectional views in a second embodiment of the present invention, each showing a blade attached in a slit groove.
Figure 10B:
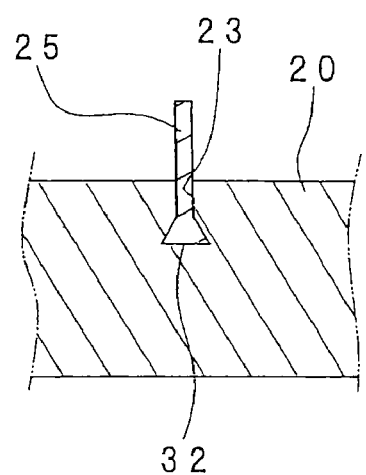
Figure 10C:
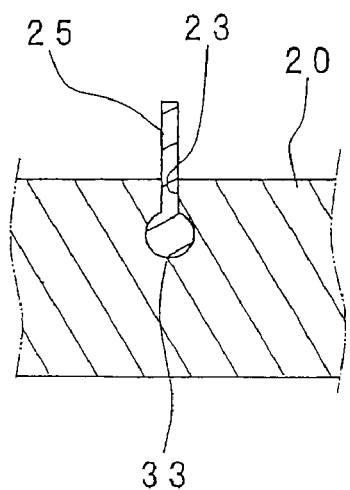

FIG. 10 show a second embodiment of the present invention, and the difference from the foregoing first embodiment resides in a coming-off prevention structure for the blade 25 (25A, 25B) relative to the slit groove 23 (23A, 23B) formed on the mold block 20 (20a-20d). That is, while the first embodiment prevents the coming-off of the blade 25 by forming to the L-shape the slit groove 23 and the blade 25 inserted therein, the second embodiment prevents the coming-off of the blade 25 by forming to a T-shape the bottom portion of the slit groove 23 and one end of the blade 25 inserted therein as shown in FIG. 10(A), by forming to a triangle shape 32 the bottom portion of the slit groove 23 and one end of the blade 25 inserted therein as shown in FIG. 10(B), or by forming to a round shape 33 the bottom portion of the slit groove 23 and one end of the blade 25 inserted therein as shown in FIG. 10(C).

Accordingly, when the blades 25 are inserted into the slit grooves 23 from the side end parts of the mold blocks 20a-20d, the blades 25 can be prevented from coming off through engagement of the T-shape 31, the triangle shape 32 or the round shape 33, and further, the replacements of the blades 25 can be done easily. The T-shape 31, the triangle shape 32 and the round shape 33 each constitute coming-off prevention engaging portions in the claims.

As described above, also in the second embodiment, because the blades 25 can be detachably attached to the slit grooves 23 in the state that the mold blocks 20a-20d are detached from the segment mold 10A, it is possible to carry out the replacements of the blades 23, and it is possible to prevent the coming-off of the blades 25 through engagement of the T-shape 31, the triangle shape 32 or the round shape 33. Also in the second embodiment, although not shown in the drawings, it is the same as the case in the first embodiment that the movements of the blades 25 in the width direction can be restricted as a result that the both ends of the blades 25 are held in contact with the side walls 16, 17 of the circumferential grooves 11a-11d by inserting the mold blocks 20a-20d with the blades 25 attached thereto into the circumferential grooves 11a-11d of the segment mold 10A.

Figure 11:
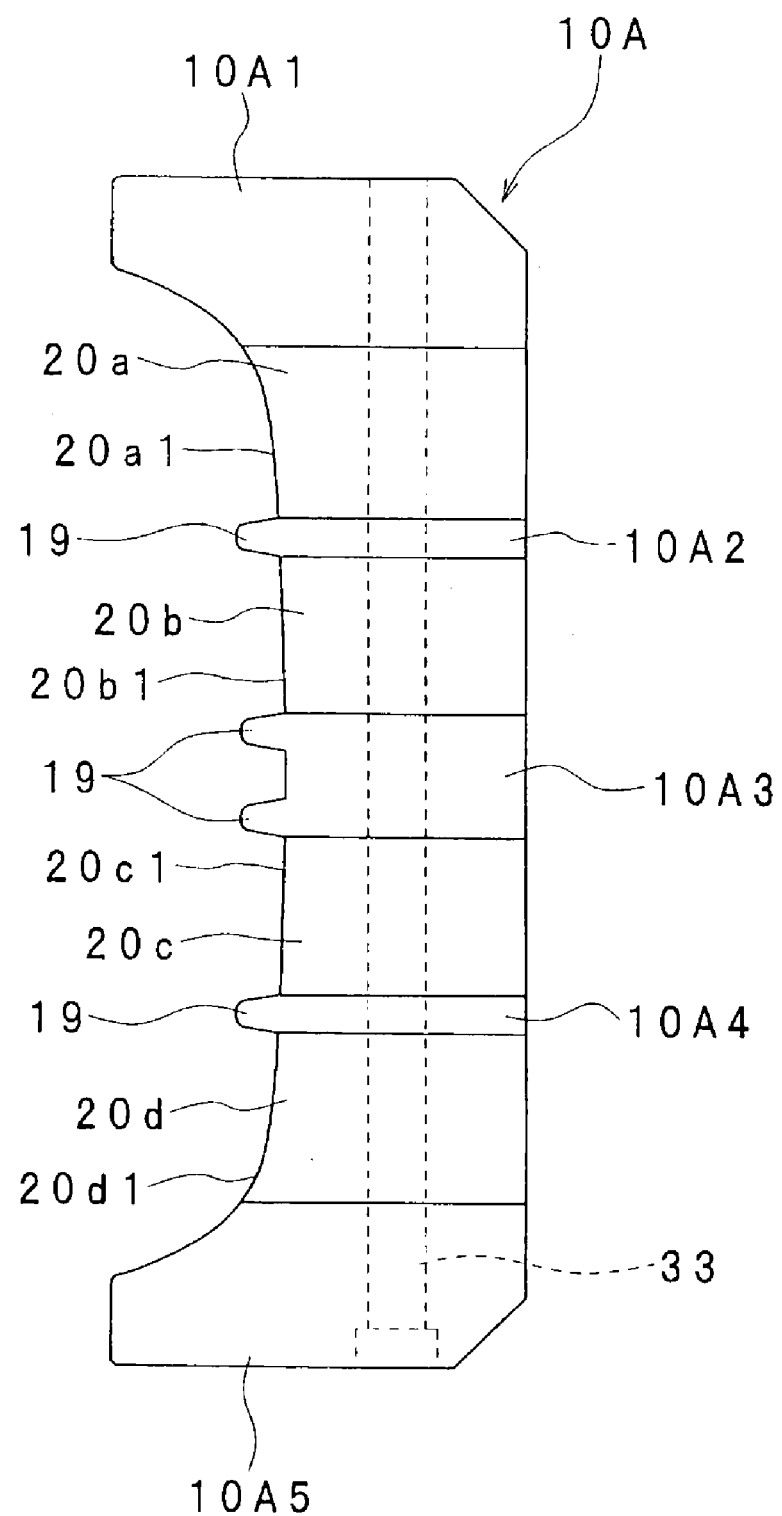
FIG. 11 is a view showing a partition surface of a circumferentially divided segment mold in a third embodiment of the present invention.

FIG. 11 shows a third embodiment of the present invention, and the difference from the first embodiment resides in that the segment mold 10A divided in the circumferential direction is further divided to plural numbers also in the width direction of the tire to form a plurality of segment mold pieces 10A1-10A5 and that the respective segment mold pieces 10A1-10A5 and the mold blocks 20a-20d are bodily jointed in the state that the plurality of mold blocks 20a-20d are placed at respective spaces between the plurality of segment mold pieces 10A1-10A5. The same constructions as those in the first embodiment are designated by the same reference numerals and thus, will be omitted from being described.

That is, in the third embodiment, as shown in FIG. 11, the segment mold 10A divided in the circumferential direction is divided into mold pieces 10A1, 10A5 which constitute both end wall portions, and mold pieces 10A2, 10A3, 10A4 which constitute three wall portions between these mold pieces 10A1, 10A5, the mold blocks 20a-20d are put in respective spaces between the plurality of these segment mold pieces 10A1-10A5 in a sandwich fashion, and the plurality of these segment mold pieces 10A1-10A5 and the mold blocks 20a-20d are bodily jointed by bolts 33 passing therethrough. In other words, the segment mold pieces 10A1-10A5 and the mold blocks 20a-20d are bodily jointed in the state that both side surfaces of the mold blocks 20a-20d are in contact with the side walls of the adjoining segment mold pieces 10A1-10A5. Also in the third embodiment, although not shown in the drawings, it is needless to say that the blades 25 inserted into the slit grooves 23 formed on the mold blocks 20a-20d are in contact at both ends thereof with side surfaces of the segment mold pieces 10A1-10A5 and thus are restricted from moving in the width direction.

Further, in the third embodiment, discharge grooves (not shown) for degassing are formed at the contact surfaces between the mold pieces 10A1-10A5 and the mold blocks 20a-20d, and the gas generated during the vulcanization forming of the tire is discharged outside of the mold 10 through these discharge grooves. That is, in the first embodiment, because the construction is such that the mold blocks 20a-20d are respectively fitted in the plurality of circumferential grooves 11a-11d formed in the segment mold 10A, respective clearances between the side walls 16, 17 of the circumferential grooves 11a-11d and both side surfaces of the mold blocks 20a-20d depend on the machining accuracy of the circumferential grooves 11a-11d, the machining accuracy of the mold blocks 20a-20d and the like and thus are difficult to be maintained all uniform, so that it is unavoidable that discrepancies appear in the clearances which are for discharging the gas. For this reason, there is an anxiety that where the clearances between the side walls 16, 17 of the circumferential grooves 11a-11d and both side surfaces of the mold blocks 20a-20d are large, fused rubber advances into the clearances during the vulcanization forming of the tire. In the third embodiment, on the contrary, because it is possible to control the clearances between the segment mold pieces 10A1-10A5 divided in the width direction and the mold blocks 20a-20d, it becomes possible to make the gas generated during the vulcanization forming go out equally through the respective spaces between the segment mold pieces 10A1-10A5 and the mold blocks 20a-20d, so that the advance of the fused rubber into the clearances during the vulcanization forming of the tire can be suppressed easily.

In the foregoing embodiment, description has been made regarding an example wherein the slit grooves 23A, 23B into which the sipe forming blades 25A and the tread groove forming blades 25B are to be inserted are respectively formed on the mold blocks 20 (20a-20d). However, there may be taken a construction that tread groove forming blades which are relatively large in thickness are formed by being cut out or the like from the mold blocks 20, while the sipe forming blades 25A only are detachably inserted into the mold blocks 20.

In the foregoing embodiments, the tread pattern shown in, for example, FIGS. 2, 3 and 5 which pattern is to be formed on the tire is only for the purpose of showing one embodiment which is preferred in describing the present invention, and it is needless to say that the tread pattern may take various configurations in dependence on the tires to which the present invention is applied.

Although the present invention has been described hereinbefore based on the embodiments, the present invention is not limited to the constructions described in the embodiments and may take various forms without departing from the gist of the present invention described in the claims.

INDUSTRIAL APPLICABILITY

A tire vulcanization forming mold according to the present invention is suitable for use in a mold which forms a tread pattern on a tire.

The invention claimed is:

1. A tire vulcanization forming mold which is circumferentially divided into a plurality of segment molds, the tire vulcanization forming mold comprising:
    a plurality of circumferential grooves formed on each segment mold with spaces in a tire width direction;
    arc-shape mold blocks respectively detachably fitted and secured in the plurality of circumferential grooves;
    a plurality of slit grooves formed on each mold block to open on a side surface of the mold block;
    tread pattern forming blades detachably inserted into the slit grooves in the tire width direction; and
    coming-off prevention engaging portions provided on the slit grooves and the blades.

2. A tire vulcanization forming mold which is circumferentially divided into a plurality of segment molds, the tire vulcanization forming mold comprising:
    a plurality of mold pieces into which each segment mold is divided in a tire width direction;
    a plurality of arc-shape mold blocks arranged in respective spaces between the plurality of the mold pieces;
    a bolt bodily securing the plurality of the mold pieces and the plurality of mold blocks;
    a plurality of slit grooves formed on each mold block to open on a side surface of the mold block;
    tread pattern forming blades detachably inserted into the slit grooves in the tire width direction; and
    coming-off prevention engaging portions provided on the slit grooves and the blades.

3. The tire vulcanization forming mold in claim 1, wherein the blades comprise sipe forming blades.

4. The tire vulcanization forming mold in claim 1, wherein the blades comprise tread groove forming blades and sipe forming blades.

5. The tire vulcanization forming mold in claim 1, wherein each segment mold has a protruding streak which is for forming a groove being continuous in a tire circumferential direction, at each place between the plurality of mold blocks.

6. The tire vulcanization forming mold in claim 1, wherein:
    the slit grooves take an L-shape as viewed from side parts of the mold blocks;
    the blades are made of L-shape metal plates which are engaged with the L-shape slit grooves; and
    the L-shapes of the slit grooves and the blades constitute the coming-off prevention engaging portions.

7. The tire vulcanization forming mold in claim 2, wherein the blades comprise sipe forming blades.

8. The tire vulcanization forming mold in claim 2, wherein the blades comprise tread groove forming blades and sipe forming blades.

9. The tire vulcanization forming mold in claim 2, wherein each segment mold has a protruding streak which is for forming a groove being continuous in a tire circumferential direction, at each place between the plurality of mold blocks.

10. The tire vulcanization forming mold in claim 2, wherein:
    the slit grooves take an L-shape as viewed from side parts of the mold blocks;
    the blades are made of L-shape metal plates which are engaged with the L-shape slit grooves; and
    the L-shapes of the slit grooves and the blades constitute the coming-off prevention engaging portions.

* * * * *

UNITED STATES PATENT AND TRADEMARK OFFICE
CERTIFICATE OF CORRECTION

PATENT NO. : 8,215,939 B2  
APPLICATION NO. : 13/122516  
DATED : July 10, 2012  
INVENTOR(S) : Chikara Takagi et al.

Page 1 of 1

It is certified that error appears in the above-identified patent and that said Letters Patent is hereby corrected as shown below:

On the Title page, Item (75):  
Inventor Chikara Takagi's city of residence change "Hashima" to --Hashima-shi--  
Inventor Tatsumi Tanaka's city of residence change "Hashimi" to --Hashima-shi--

Signed and Sealed this  
Sixth Day of November, 2012

David J. Kappos  
*Director of the United States Patent and Trademark Office*